United States Patent
Weinenger

(10) Patent No.: US 10,018,148 B2
(45) Date of Patent: Jul. 10, 2018

(54) PISTON WITH COOLING GALLERY HAVING ENHANCED OIL INLET AND METHOD OF CONSTRUCTION THEREOF

(71) Applicant: Federal-Mogul Corporation, Southfield, MI (US)

(72) Inventor: Michael Weinenger, Southfield, MI (US)

(73) Assignee: Federal-Mogul LLC, Southfield, MI (US)

( * ) Notice: Subject to any disclaimer, the term of this patent is extended or adjusted under 35 U.S.C. 154(b) by 193 days.

(21) Appl. No.: 14/975,451

(22) Filed: Dec. 18, 2015

(65) Prior Publication Data

US 2016/0177865 A1 Jun. 23, 2016

Related U.S. Application Data

(60) Provisional application No. 62/094,258, filed on Dec. 19, 2014.

(51) Int. Cl.
*F02F 3/16* (2006.01)
*F02F 3/22* (2006.01)
(Continued)

(52) U.S. Cl.
CPC ............. *F02F 3/22* (2013.01); *B23P 15/10* (2013.01); *F02F 3/0015* (2013.01); *F02F 3/00* (2013.01);
(Continued)

(58) Field of Classification Search
CPC ................... F02F 3/16; F02F 3/00; F02F 3/28
(Continued)

(56) References Cited

U.S. PATENT DOCUMENTS 2,819,936 A 1/1958 Cambeis
3,221,718 A 12/1965 Isley
(Continued)

FOREIGN PATENT DOCUMENTS

DE 3511852 1/1987
DE 102011007285 A1 10/2012
(Continued)

OTHER PUBLICATIONS

International Search Report, dated Feb. 12, 2016 (PCT/US2015/066918).

*Primary Examiner* — Jacob Amick
*Assistant Examiner* — Charles Brauch
(74) *Attorney, Agent, or Firm* — Robert L. Stearns; Dickinson Wright, PLLC

(57) ABSTRACT

A piston and method of construction thereof are provided. The piston includes an upper crown having an upper combustion surface and a lower crown depending therefrom. The lower crown includes a pair of laterally spaced, axially aligned pin bores configured for receipt of a wrist pin. A substantially closed, annular outer cooling gallery is formed between the upper and lower crowns, wherein a bottom surface of the cooling gallery is formed by a floor of the lower crown. An oil inlet and an oil outlet extend through the floor. The oil inlet includes an upstanding toroid-shaped protrusion that extends upwardly from the floor into the cooling gallery, wherein the protrusion is formed as a monolithic extrusion from the material of the lower crown floor.

11 Claims, 2 Drawing Sheets

(51) Int. Cl.
*B23P 15/10* (2006.01)
*F02F 3/00* (2006.01)
*F02F 3/28* (2006.01)

(52) U.S. Cl.
CPC . *F02F 3/16* (2013.01); *F02F 3/28* (2013.01); *F02F 2003/0007* (2013.01); *F02F 2003/0061* (2013.01); *F02F 2200/04* (2013.01)

(58) Field of Classification Search
USPC ..................................................... 123/193.6
See application file for complete search history.

(56) References Cited

U.S. PATENT DOCUMENTS

| | | | |
|---|---|---|---|
| 4,180,027 A | 12/1979 | Taylor | |
| 6,401,595 B1 | 6/2002 | Bochart | |
| 6,477,941 B1 | 11/2002 | Zhu et al. | |
| 6,634,278 B2 | 10/2003 | Bochart | |
| 6,651,549 B2 | 11/2003 | Zhu et al. | |
| 6,722,263 B2 | 4/2004 | Keller et al. | |
| 6,840,155 B2 | 1/2005 | Ribeiro et al. | |
| 7,051,684 B2 | 5/2006 | Bauer | |
| 7,281,466 B1 * | 10/2007 | Wilksch | B22C 9/105 92/186 |
| 8,739,755 B2 | 6/2014 | Stan et al. | |
| 8,813,712 B2 | 8/2014 | Bing et al. | |
| 2009/0013531 A1 * | 1/2009 | Heraldo | B21K 1/18 29/888.04 |
| 2011/0265743 A1 | 11/2011 | Ask et al. | |
| 2012/0080004 A1 * | 4/2012 | Menezes | F02F 3/003 123/193.6 |
| 2013/0025550 A1 | 1/2013 | IBler et al. | |
| 2013/0098316 A1 * | 4/2013 | Stan | F02F 3/003 123/41.35 |
| 2014/0130767 A1 | 5/2014 | Leitl | |
| 2014/0174384 A1 | 6/2014 | Ask et al. | |

FOREIGN PATENT DOCUMENTS

FR 2839116 A1 10/2003
GB 916696 A 1/1963

* cited by examiner

PISTON WITH COOLING GALLERY HAVING ENHANCED OIL INLET AND METHOD OF CONSTRUCTION THEREOF

CROSS-REFERENCE TO RELATED APPLICATION

This application claims the benefit of U.S. Provisional Application Ser. No. 62/094,258, filed Dec. 19, 2014, which is incorporated herein by reference in its entirety.

BACKGROUND OF THE INVENTION

1. Technical Field

This invention relates generally to internal combustion engines, and more particularly to pistons and their method of construction.

2. Related Art

Pistons for internal combustion engines are known to include annular cooling galleries to facilitate maintaining the pistons within operable temperature limits. Once oil is delivered into the cooling gallery through an oil inlet, typically located on one side of the piston, it is desirable to have the oil circulate to an opposite side of the piston and exit through an oil outlet, whereupon the oil typically returns to the crankcase. If the oil is allowed to exit the oil inlet, insufficient cooling of the piston can result, thereby potentially diminishing the useful life of the piston.

Some attempts have been made to prevent the exit of oil through the oil inlet. A known mechanism includes the fixation of a separate annular part to the piston, about the oil inlet, to form an upstanding barrier about the oil inlet to inhibit the egress of oil. Although this can prove effective, the need to perform a secondary attachment process to attach the part to the piston, such as via welding, comes with addition part and manufacturing process costs. Another known attempt includes the formation of a barrier in a casting operation, and again, although this can prove effective, it requires the piston part to be cast, which is not always desirable, depending on the piston application as well as the manufacture process of the piston. Further, casting in the barrier requires special molds for each different form of piston being made, and comes with inherent costs.

SUMMARY OF THE INVENTION

In accordance with one aspect of the invention, a piston includes an upper crown having an upper combustion surface with a generally cylindrical upper land, including a ring belt region, depending therefrom and a lower crown depending from the upper crown. The lower crown includes a pair of laterally spaced, axially aligned pin bores configured for receipt of a wrist pin to facilitate coupling the piston to a connecting rod. A substantially closed, annular outer cooling gallery is formed between the upper and lower crowns, wherein a bottom surface of the cooling gallery is formed by a floor of the lower crown. An oil inlet and an oil outlet extend through the floor, wherein the oil inlet is operable to allow oil to flow into the cooling gallery and the oil outlet is operable to allow oil to flow outwardly from the cooling gallery, thereby forming an oil flow circuit. To facilitate forming a one-way flow of oil into the cooling gallery through the oil inlet and outwardly from the cooling gallery through the oil outlet, thereby enhancing the cooling effectiveness of the cooling gallery and the oil flowing therethrough, the oil inlet includes an upstanding toroid-shaped protrusion that extends upwardly from the floor into the cooling gallery, wherein the protrusion is formed as a monolithic extrusion from the material of the lower crown floor. The protrusion inhibits the reverse flow of oil outwardly from the cooling gallery through the oil inlet, and as such, the oil is necessarily circulated, as intended, through the cooling gallery and out the oil outlet.

In accordance with another aspect of the invention, the material of the oil inlet is hardened relative to the remaining material of the floor.

In accordance with another aspect of the invention, the floor has a thickness immediately adjacent the protrusion, and the protrusion has a height between about ½-3 times the thickness.

In accordance with another aspect of the invention, the protrusion extends from the floor to a free end, wherein the protrusion has a first wall thickness immediately adjacent the floor and a second wall thickness immediately adjacent the free end, wherein the first thickness is greater than the second thickness.

In accordance with another aspect of the invention, the wall thickness of the protrusion decreases continuously from the floor to the free end.

In accordance with another aspect of the invention, a method of constructing a piston for an internal combustion engine is provided. The method includes forming an upper crown having an upper combustion surface with a generally cylindrical upper land, including a ring belt region, depending therefrom and forming a lower crown depending from the upper crown. The method further includes forming the lower crown having a pair of laterally spaced, axially aligned pin bores configured for receipt of a wrist pin to facilitate coupling the piston to a connecting rod. The method further includes forming a substantially closed, annular outer oil gallery between the upper and lower crowns, wherein a bottom surface of the cooling gallery is formed by a floor of the lower crown. Further yet, the method includes forming an oil inlet and an oil outlet extending through the floor. In forming the oil inlet, the method includes simultaneously forming an opening in the floor and displacing material of the floor upwardly from the floor, wherein the displaced material forms an upstanding toroid-shaped protrusion that acts to inhibit oil from flowing in reverse direction outwardly from the cooling gallery back through the oil inlet. With the protrusion being formed as a result of forming the inlet, significant manufacturing efficiencies are realized, thereby minimizing the cost associated with forming the protrusion.

In accordance with another aspect of the invention, the method can further include forming the upstanding toroid-shaped protrusion in a form drilling process.

In accordance with another aspect of the invention, the method can further include hardening the material of the protrusion while forming the oil inlet.

In accordance with another aspect of the invention, the method can further include forming the protrusion having a height between about ½-3 times the thickness of the floor immediately adjacent the protrusion.

In accordance with another aspect of the invention, the method can further include forming the protrusion extending from the floor to a free end, and forming the protrusion having a first wall thickness immediately adjacent the floor and a second wall thickness immediately adjacent the free end, and forming the first thickness being greater than the second thickness.

In accordance with another aspect of the invention, the method can further include forming the wall thickness of the protrusion so that it decreases continuously from the floor to the free end.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
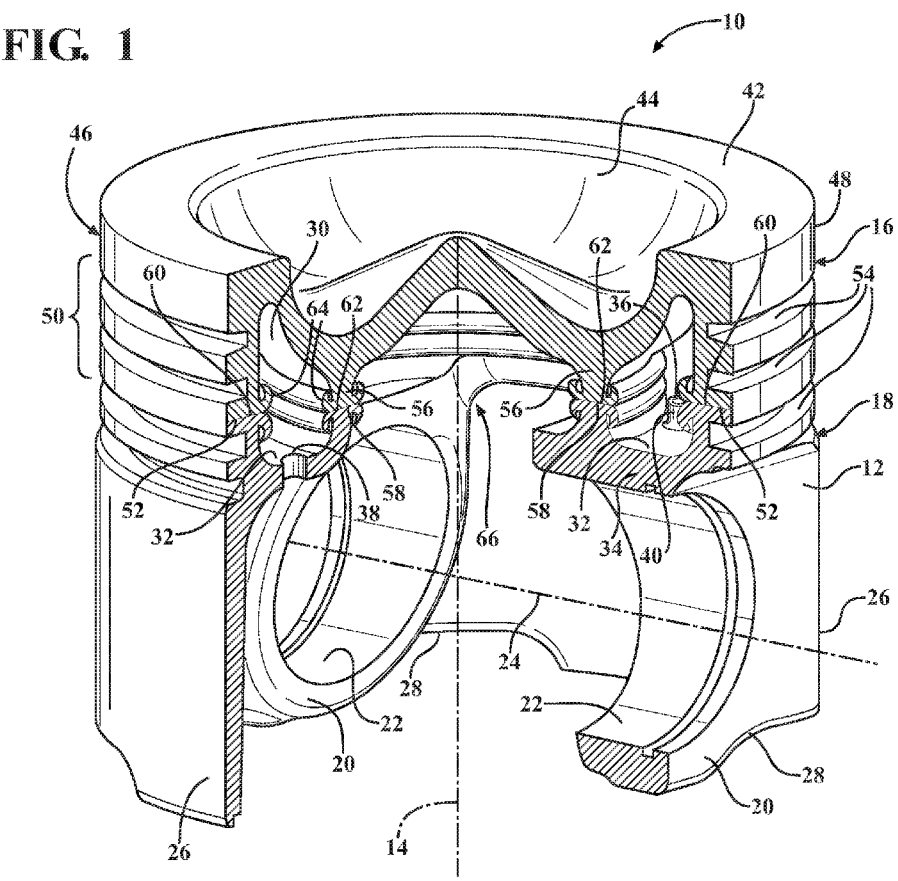
FIG. 1 is a partially sectioned perspective view of a piston constructed in accordance with one aspect of the invention.
Figure 2A:
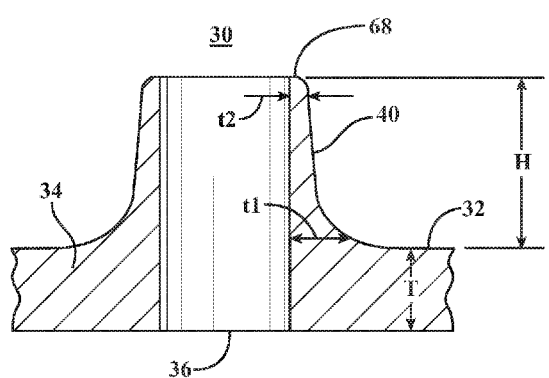
FIG. 2A is an enlarged, fragmentary cross-sectional view taken through an oil inlet of the piston of FIG. 1.
Figure 2:
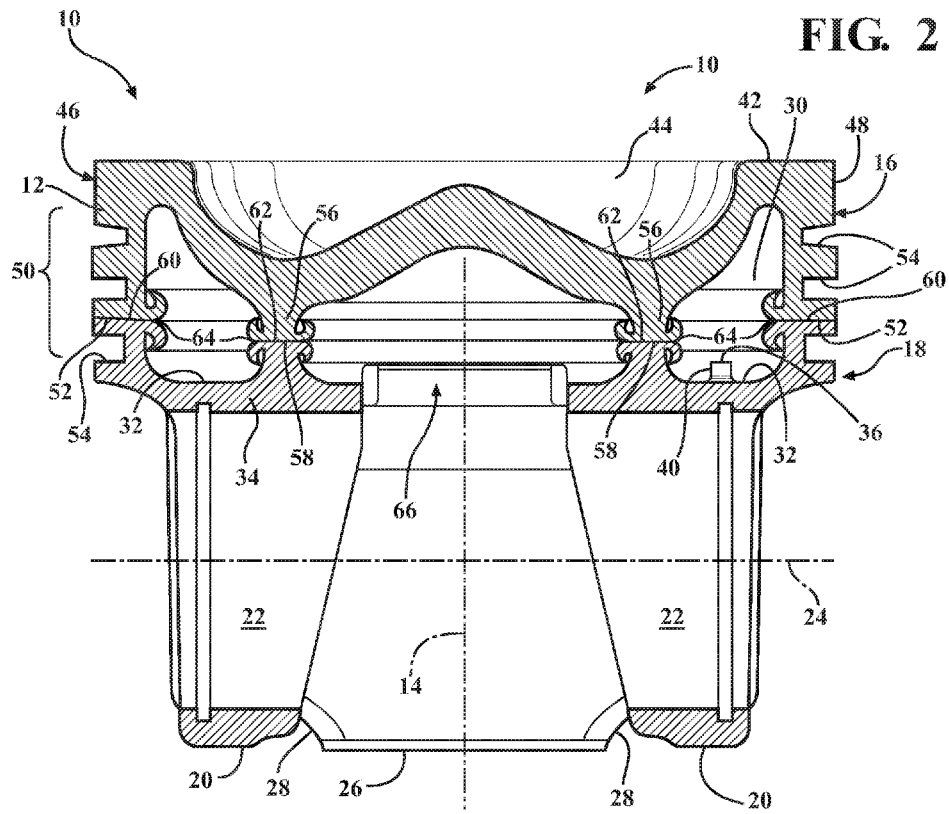
FIG. 2 is a cross-sectional view taken generally along a pin bore axis of the piston of FIG. 1.
Figure 3:
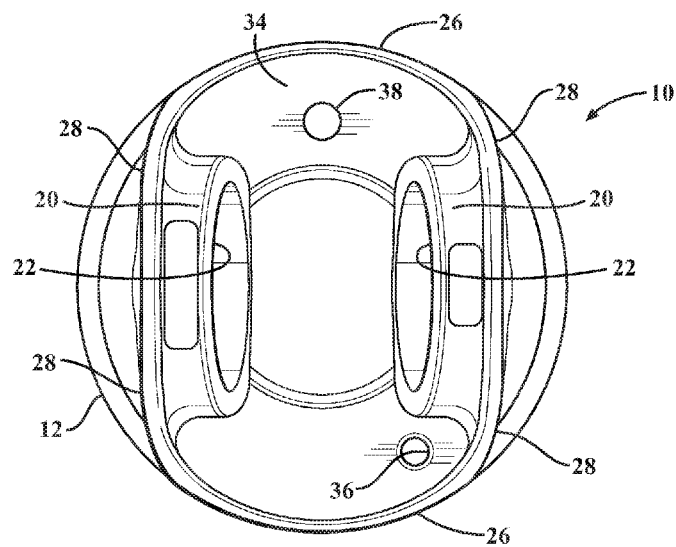
FIG. 3 is a bottom plan view of the piston of FIG. 1.

Referring in more detail to the drawings, FIGS. 1 and 2 illustrate a piston 10 constructed according to one presently preferred embodiment of the invention for reciprocating movement in a cylinder bore or chamber of an internal combustion engine, such as a heavy duty diesel engine, by way of example and without limitation. The piston 10 has a body 12 extending along a central longitudinal axis 14 along which the piston 10 reciprocates in the cylinder bore. The body 12 has an upper crown 16 and a lower crown 18. The lower crown 18 has a pair of pin bosses 20 depending from the upper crown 16 to provide laterally spaced pin bores 22 aligned with one another along a pin bore axis 24 that extends generally transversely to the central longitudinal axis 14. The pin bosses 20 are joined to laterally spaced, diametrically opposite skirt portions 26 via strut portions 28. A substantially closed, annular outer oil cooling gallery 30 is formed between the upper and lower crowns 16, 18, wherein a bottom surface, also referred to as floor 32, of the cooling gallery 30 is formed by a wall 34 of the lower crown 18. An oil inlet 36 and an oil outlet 38 (FIGS. 1 and 3) extend through the floor 32, wherein the oil inlet 36 is operable to allow oil to flow into the cooling gallery 30 and the oil outlet 38 is operable to allow oil to flow outwardly from the cooling gallery 30. To facilitate a one-way flow of oil into the cooling gallery 30 through the oil inlet 36, the oil inlet 36 includes an upstanding toroid-shaped wall, also referred to as a protrusion 40, that extends upwardly from the floor 32 into the cooling gallery 30, wherein the protrusion 40 is formed as a monolithic, hardened extrusion from the material of lower crown wall 34. With the protrusion 40 extending upwardly from the floor 32, oil is inhibited from flowing in a reverse flow direction back through the inlet 36, and thus, the oil, once having entered the cooling gallery 30 through the inlet 36 is prompted to circulate through the cooling gallery 30, as intended, to a location generally or substantially diametrically opposite the inlet 36, whereupon the oil is caused to flow outwardly from the cooling gallery 30 through the oil outlet 38, given the outlet 38 does not have an upstanding protrusion. As such, the oil flows through the cooling gallery 30 in a one-way flow circuit, thereby promoting optimal cooling of the piston 10 by both causing fresh oil to continuously enter and exit the cooling gallery 30, thereby inhibiting coking of the oil within the cooling gallery 30, while also assuring the oil flows throughout the entirety of the cooling gallery 30 prior to exiting, thereby promoting uniform cooling of the piston 10.

The upper crown 16 of the piston 10 is represented here as having an upper combustion surface 42 with a combustion bowl 44 recessed therein to provide a desired gas flow within the cylinder bore. A generally cylindrical outer wall 46, including an upper land 48 and a ring belt 50, extends downwardly from the upper combustion surface 42 to an annular outer free end 52, with at least one annular ring groove 54 being formed in the ring belt 50 for floating receipt of a piston ring (not shown). An annular inner rib 56 depends from an undercrown surface of the combustion bowl 44 to an inner free end 58.

The lower crown 18 can be constructed separately from the upper crown 16, such as in a forging process, by way of example and without limitation, and can then be joined to the upper crown 16 via an upstanding annular outer rib free end 60 and an upstanding annular inner rib free end 62. The upper and lower crowns 16, 18 are represented here as being joined together by a friction weld, induction weld or any other suitable type of weld joint 64 formed across the respective outer free ends 52, 60 and inner free ends 58, 62, for example. As such, the substantially closed, annular outer oil gallery 30 is formed between the upper and lower crowns 16, 18, while an open inner gallery 66 is formed upwardly of the pin bores 22 beneath a central portion of the combustion bowl 44. It should be recognized that the piston 10, constructed in accordance with the invention, could have upper and lower crown portions formed otherwise, including being formed as a single, monolithic piece of material and having different configurations of oil galleries, for example.

The oil inlet 36 and protrusion 40 are formed in a form drilling process, also referred to as flow or friction drilling, and can be formed in the lower crown 18 at any stage of piston manufacture, even after the upper crown 16 and lower crown 18 have been joined to one another, if formed as separate parts. This is made possible as a result of the protrusion 40 being formed simultaneously in the form drilling process used to form the opening of the oil inlet 36. Flexibility is provided in the manufacture of the piston 10, which in turn can result in cost savings, aside from the reduction in manufacture processes needed to construct the protrusion 40. The floor 32 has a thickness (T) immediately adjacent the protrusion 40 and the protrusion 40 is formed having a height (H) between about ½-3 times the thickness T, and preferably about or greater than 1 times the thickness T. The tubular protrusion 40 extends upwardly from the floor 32 to a free end 68. The protrusion 40 has a first wall thickness (t1) immediately adjacent the floor 32 and a second wall thickness (t2) immediately adjacent the free end 68, with the first thickness (t1) being greater than the second thickness (t2). The wall thickness of the protrusion 40 decreases continuously or substantially continuously from thickness t1 adjacent the floor 32 to the free end 68. The configuration and increased hardness of the protrusion 40, relative to the hardness of the floor 32, is a direct result of the drill forming process, which in turn provide the protrusion 40 with its enhanced strength and configuration benefits.

Obviously, many modifications and variations of the present invention are possible in light of the above teachings. It is, therefore, to be understood that within the scope of the appended claims, the invention may be practiced otherwise than as specifically described.

What is claimed is:

1. A piston for an internal combustion engine, comprising:
an upper crown having an upper combustion surface with a generally cylindrical upper land, including a ring belt region, depending therefrom;
a lower crown depending from the upper crown, the lower crown including a pair of laterally spaced, axially aligned pin bores configured for receipt of a wrist pin;
a substantially closed, annular outer cooling gallery formed between the upper and lower crowns, said cooling gallery having a bottom surface formed by a floor of the lower crown;
an oil inlet and an oil outlet extending through said floor, wherein said oil inlet is bounded by an upstanding toroid-shaped tubular protrusion that extends upwardly from said floor into the cooling gallery, wherein said protrusion is formed as a monolithic extrusion from the material of said floor.

2. The piston of claim 1 wherein the material of said oil inlet is hardened relative to the remaining material of said floor.

3. The piston of claim 1 wherein said floor has a thickness immediately adjacent said protrusion, said protrusion having a height between about ½-3 times said thickness.

4. The piston of claim 1 wherein said protrusion extends from said floor to a free end, said protrusion having a first wall thickness immediately adjacent said floor and a second wall thickness immediately adjacent said free end, said first thickness being greater than said second thickness.

5. The piston of claim 4 wherein said wall thickness decreases continuously from said floor to said free end.

6. A method of constructing a piston for an internal combustion engine, comprising:
forming an upper crown having an upper combustion surface with a generally cylindrical upper land, including a ring belt region, depending therefrom;
forming a lower crown depending from the upper crown with the lower crown having a pair of laterally spaced pin bosses with axially aligned pin bores;
forming a substantially closed, annular outer cooling gallery between the upper and lower crowns, wherein a bottom surface of the cooling gallery is formed by a floor of the lower crown; and
forming an oil inlet and an oil outlet through the floor, and while forming the oil inlet, simultaneously forming an opening and displacing material of the floor upwardly from the floor, wherein the displaced material forms an upstanding toroid-shaped protrusion.

7. The method of claim 6 further including hardening the material of the protrusion while forming the oil inlet.

8. The method of claim 6 further including forming the protrusion having a height between about ½-3 times the thickness of the floor immediately adjacent the protrusion.

9. The method of claim 6 further including forming the protrusion extending from the floor to a free end, and forming the protrusion having a first wall thickness immediately adjacent the floor and a second wall thickness immediately adjacent the free end, and forming the first thickness being greater than the second thickness.

10. The method of claim 9 further including forming the wall thickness so that it decreases continuously from the floor to the free end.

11. The method of claim 6 further forming the protrusion in a form drilling process.

* * * * *